(12) United States Patent
Onodera et al.

(10) Patent No.: US 10,903,471 B2
(45) Date of Patent: Jan. 26, 2021

(54) BATTERY PACK

(71) Applicant: Nissan Motor Co., Ltd., Yokohama (JP)

(72) Inventors: Makoto Onodera, Kanagawa (JP); Yuta Motohashi, Kanagawa (JP); Yusuke Tsuji, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 207 days.

(21) Appl. No.: 16/327,879

(22) PCT Filed: Sep. 26, 2016

(86) PCT No.: PCT/JP2016/078269
§ 371 (c)(1),
(2) Date: Feb. 25, 2019

(87) PCT Pub. No.: WO2018/055764
PCT Pub. Date: Mar. 29, 2018

(65) Prior Publication Data
US 2019/0198848 A1    Jun. 27, 2019

(51) Int. Cl.
*H01M 2/20* (2006.01)
*H01M 2/10* (2006.01)
(Continued)

(52) U.S. Cl.
CPC ............ *H01M 2/206* (2013.01); *B23K 26/21* (2015.10); *H01M 2/0212* (2013.01); *H01M 2/10* (2013.01);
(Continued)

(58) Field of Classification Search
None
See application file for complete search history.

(56) References Cited

U.S. PATENT DOCUMENTS

| 4,098,966 A | * | 7/1978 | Brown | H01M 2/266 |
| | | | | 429/161 |
| 2001/0031395 A1 | * | 10/2001 | Fukuda | H01M 10/12 |
| | | | | 429/211 |

(Continued)

FOREIGN PATENT DOCUMENTS

| EP | 3 062 365 A1 | 8/2016 |
| JP | 2012-109275 A | 6/2012 |

(Continued)

*Primary Examiner* — Robert S Carrico
(74) *Attorney, Agent, or Firm* — Global IP Counselors, LLP

(57) ABSTRACT

A battery pack has a plurality of unit cells, a bus bar and a plate portion. The unit cells each includes a cell body having a power-generating element and being formed in a flat shape. Each unit cell has an electrode tab that extends out from a corresponding one of the cell bodies. The unit cells are stacked in a thickness direction of the cell bodies. The bus bar is electrically connected to the electrode tabs by laser welding. The plate portion forms a stacked structure together with the electrode tabs along an irradiation direction of the laser. Each electrode tab includes an anode-side electrode tab and a cathode-side electrode tab. The cathode-side electrode tabs have a different thickness than the anode-side electrode tabs. The plate portion is only provided on the ones of the anode-side electrode tabs and the cathode-side electrode tabs that have a smaller thickness.

8 Claims, 9 Drawing Sheets

(51) Int. Cl.
   *H01M 2/30* (2006.01)
   *H01M 2/02* (2006.01)
   *B23K 26/21* (2014.01)
(52) U.S. Cl.
   CPC .......... *H01M 2/1077* (2013.01); *H01M 2/20* (2013.01); *H01M 2/30* (2013.01); *H01M 2220/20* (2013.01)

(56) References Cited

U.S. PATENT DOCUMENTS

| | | |
|---|---|---|
| 2014/0127550 A1 | 5/2014 | Roh et al. |
| 2016/0248068 A1 | 8/2016 | Ha |

FOREIGN PATENT DOCUMENTS

| | | |
|---|---|---|
| JP | 2012-515418 A | 7/2012 |
| JP | 2014-110219 A | 6/2014 |
| JP | 2016-119377 A | 6/2016 |
| JP | 2016-157670 A | 9/2016 |
| KR | 10-2013-0012547 A | 2/2013 |
| KR | 10-1305250 B1 | 9/2013 |
| KR | 10-2015-0113758 A | 10/2015 |
| KR | 10-1565115 B1 | 11/2015 |
| WO | 2014/178130 A1 | 11/2014 |
| WO | 2016/017668 A1 | 2/2016 |

\* cited by examiner

BATTERY PACK

CROSS-REFERENCE TO RELATED APPLICATIONS

This application is a U.S. national stage application of International Application No. PCT/JP2016/078269, filed on Sep. 26, 2016.

BACKGROUND

Technical Field

The present invention relates to a battery pack.

Background Information

A battery pack is, for example, mounted on a vehicle such as an electric vehicle and used as a power source for driving a vehicle motor. A battery pack is configured by stacking a plurality of unit cells. In the stacked unit cells, electrode tabs (battery terminals) that are extend out from each unit cell are electrically connected to each other by means of bus bars (bus bar/jumper) (e.g., Japanese Laid Open Patent Application No. 2012-515418 referred to hereinafter as Patent Document 1). In addition, the connection between the electrode tabs and the bus bars is carried out by laser welding.

SUMMARY

In the configuration of Patent Document 1, when connecting the electrode tabs and the bus bars by laser irradiation, if the laser output is increased in order to improve the welding quality there is a possibility that the laser will penetrate the electrode tabs and that suitable welding cannot be achieved.

An object of the present invention is to provide a battery pack in which electrode tabs and bus bars can be suitably laser-welded by preventing the laser from penetrating the electrode tabs, even if the laser output is increased in order to improve the welding quality.

In order to achieve the object described above, a battery pack according to the present invention comprises unit cells that each includes a cell body having a power-generating element and being formed in a flat shape and in which an electrode tab extends out from the cell body, and which are stacked in a thickness direction of the cell bodies. In addition, the battery pack comprises a bus bar electrically connected to the electrode tab by laser welding, and a plate portion that forms a stacked structure together with the electrode tab along an irradiation direction of the laser.

By means of the battery pack of the present invention having the configuration described above, electrode tabs and bus bars can be suitably laser-welded by preventing the laser from penetrating the electrode tabs even if the laser output is increased in order to improve the welding quality.

DETAILED DESCRIPTION OF THE EMBODIMENTS

Figure 1:
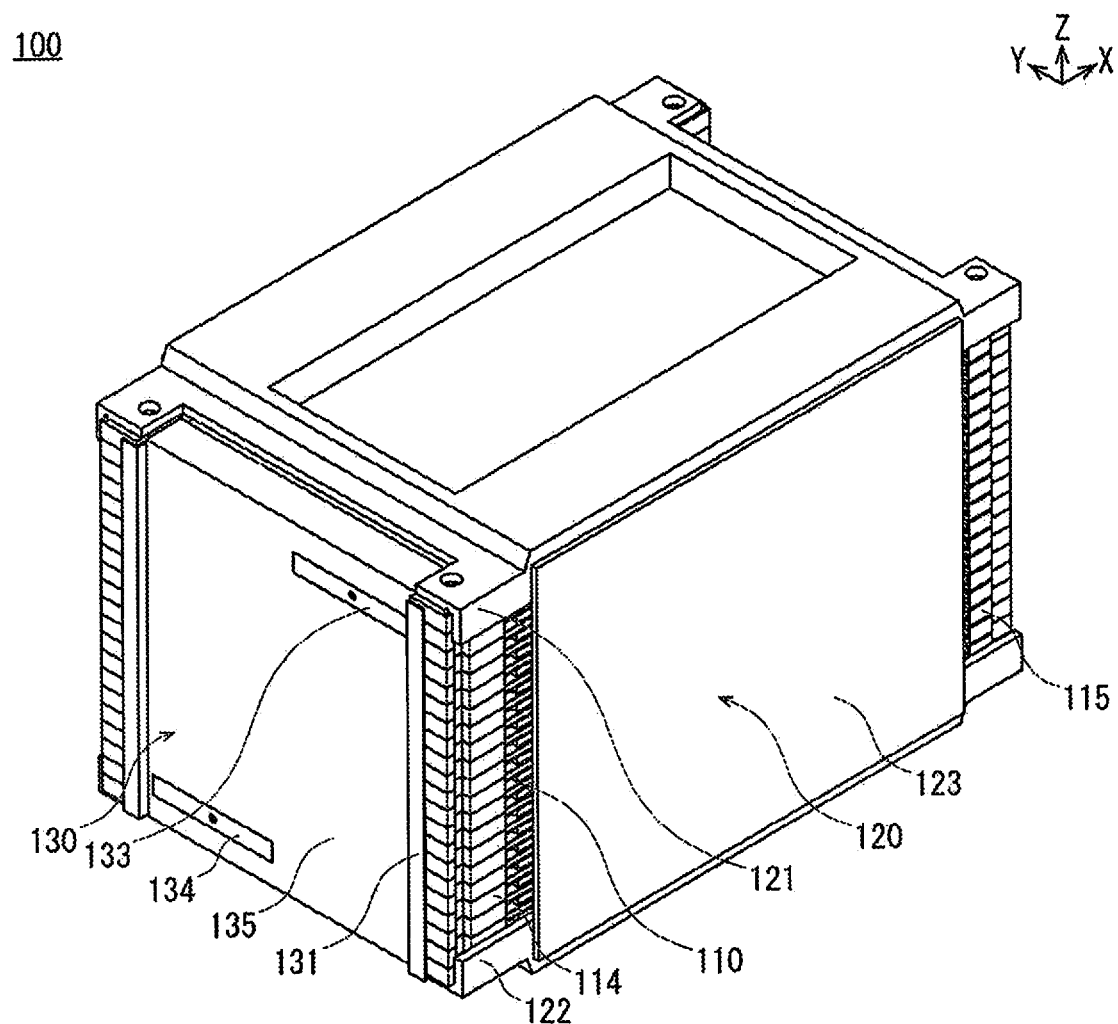
FIG. 1 is a perspective view illustrating a battery pack according to an embodiment.

An embodiment of the present invention will be explained below with reference to the appended drawings. In the drawings, the same members have been assigned the same reference symbols, and redundant explanations have been omitted. In the drawings, the sizes and ratios of the members have been exaggerated to facilitate understanding the embodiment, and may be different from the actual sizes and ratios.

In each drawing the orientation of a battery pack 100 is shown using arrows indicated by X, Y, and Z. The direction of the arrow indicated by X is the longitudinal direction of the battery pack 100. The direction of the arrow indicated by Y is the transverse direction of the battery pack 100. The direction of the arrow indicated by Z is the stacking direction of the battery pack 100.

Figure 2:
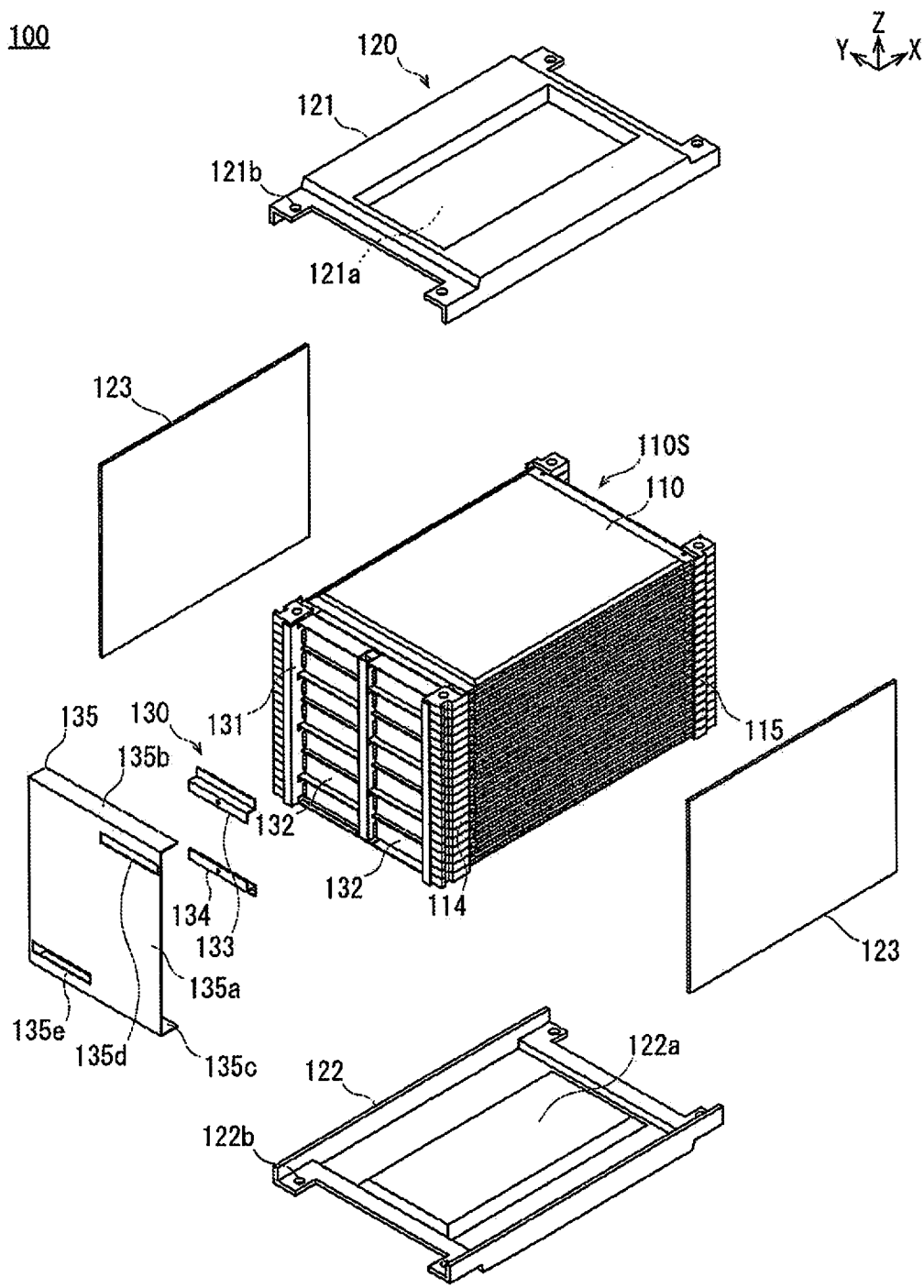
FIG. 2 is a perspective view illustrating a state in which a portion of a bus bar unit (a protective cover, an anode-side terminal, and a cathode-side terminal) as well as a pressurizing unit (an upper pressure plate, a lower pressure plate, and left and right side plates) are removed from the battery pack shown in FIG. 1.
Figure 3:
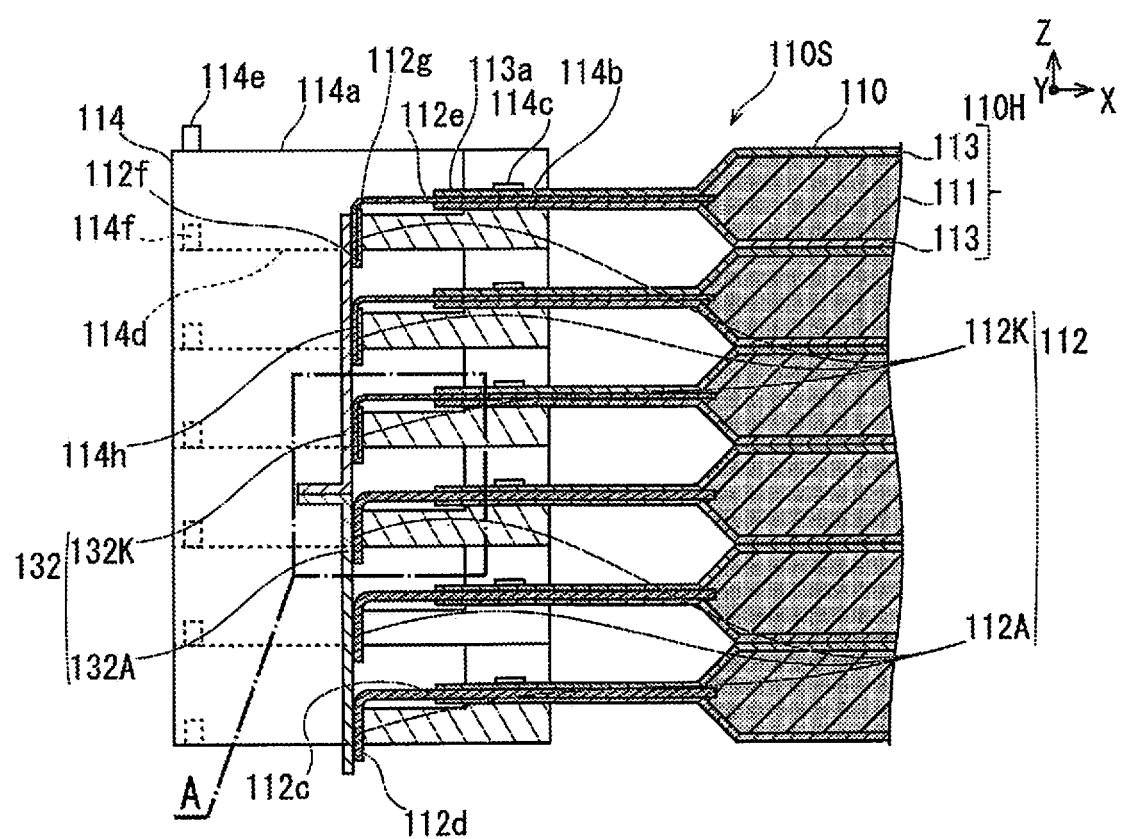
FIG. 3 is a side view illustrating a cross section of a main part of a state in which a bus bar is joined to electrode tabs of stacked unit cells.
Figure 4:
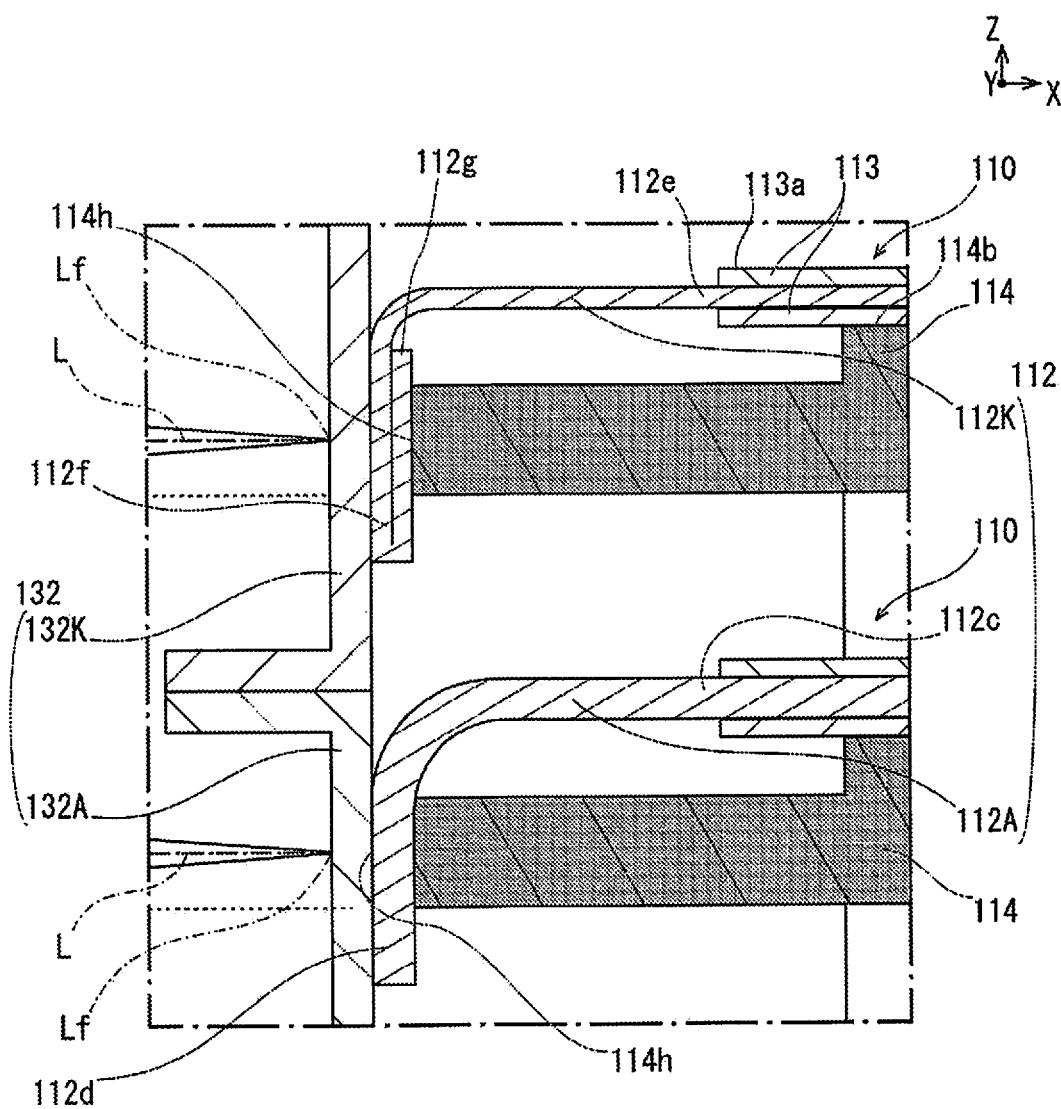
FIG. 4 is an enlarged view of the location indicated by reference symbol A in FIG. 3.
Figure 5:
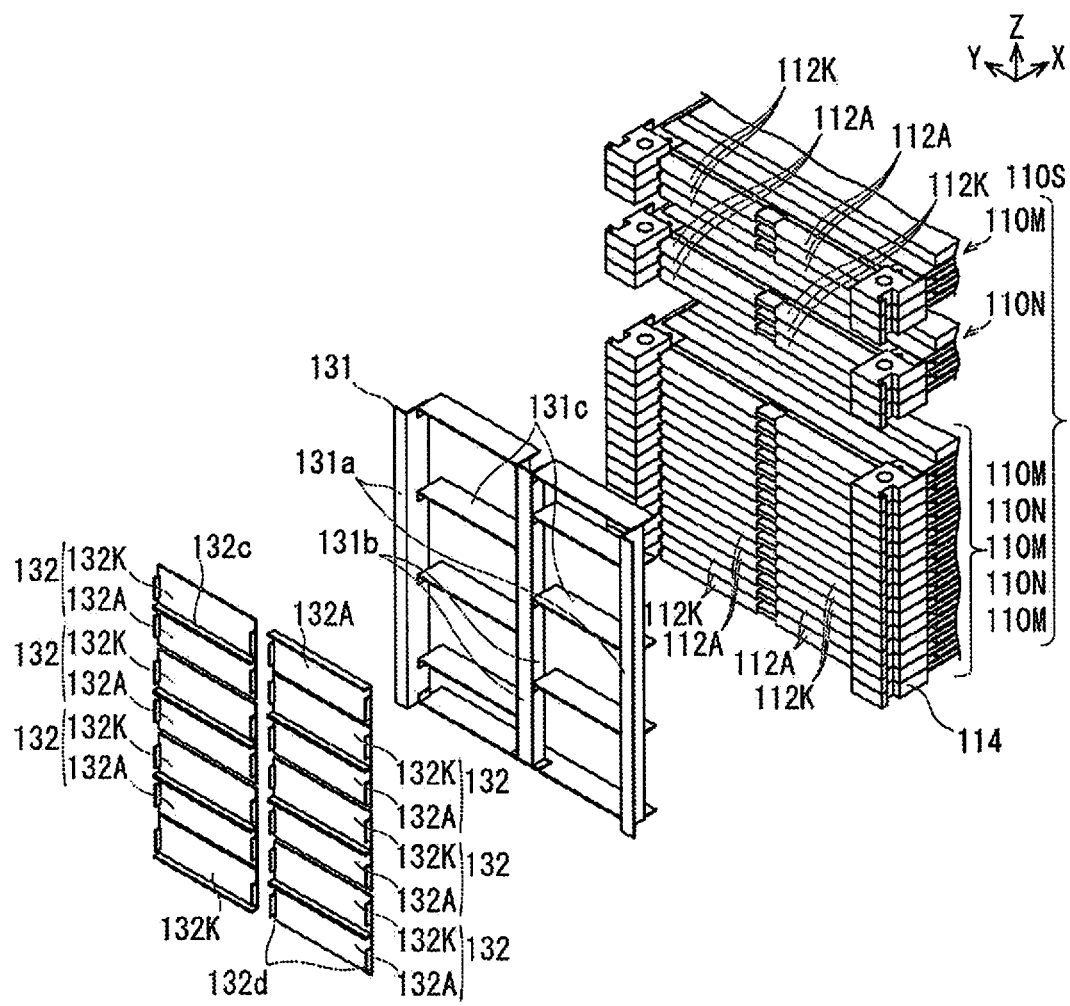
FIG. 5 is a perspective view illustrating a state in which a bus bar holder and the bus bars are removed from the stacked body illustrated in FIG. 2.
Figure 6:
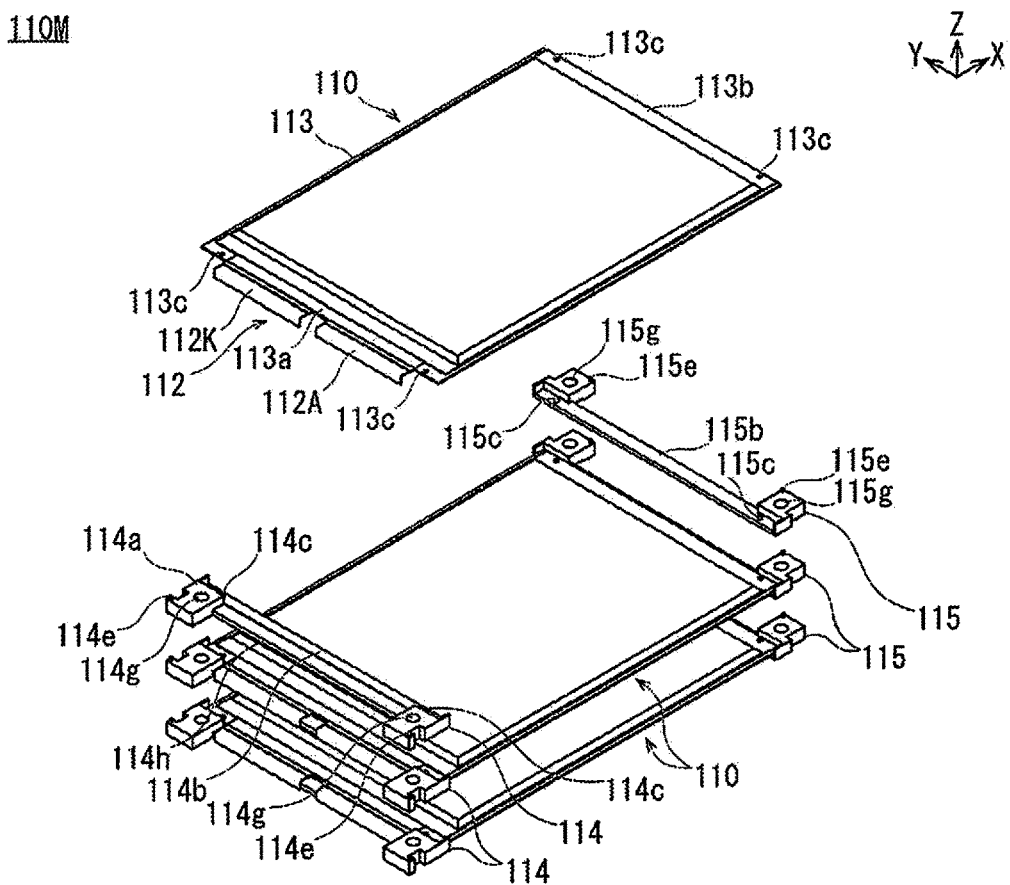
FIG. 6 is a perspective view illustrating a state in which a first cell sub-assembly (three sets of unit cells connected in parallel) shown in FIG. 5 is disassembled for each unit cell, and a first spacer and a second spacer are removed from one (the uppermost) unit cell thereof.
Figure 7:
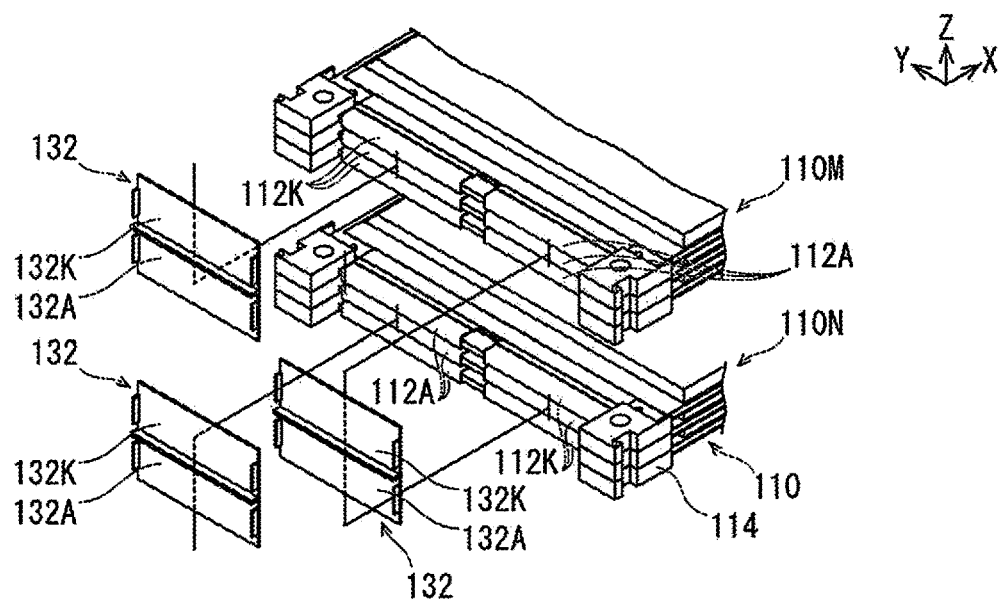
FIG. 7 is a perspective view illustrating a state in which the first cell sub-assembly and a second cell sub-assembly shown in FIG. 5 are electrically connected by means of bus bars. The perspective view shows a state in which the bus bar holder and the bus bars are removed.

FIG. 1 is a perspective view illustrating the battery pack 100 according to an embodiment. FIG. 2 is a perspective view illustrating a state in which a portion of a bus bar unit 130 (a protective cover 135, an anode-side terminal 133, and a cathode-side terminal 134) as well as a pressurizing unit 120 (an upper pressure plate 121, a lower pressure plate 122, and left and right side plates 123) are removed from the battery pack 100 shown in FIG. 1. FIG. 3 is a side view illustrating a cross section of a main part of a state in which a bus bar 132 is joined to electrode tabs 112 of stacked unit cells 110. FIG. 4 is an enlarged view of the location indicated by reference symbol A in FIG. 3. FIG. 5 is a perspective view illustrating a state in which a bus bar holder 131 and the bus bars 132 are removed from a stacked body 110S illustrated in FIG. 2. FIG. 6 is a perspective view illustrating a state in which a first cell sub-assembly 110M (three sets of the unit cells 110 connected in parallel) shown in FIG. 5 is disassembled for each unit cell 110, and a first spacer 114 and a second spacer 115 are removed from one (the uppermost) unit cell 110 thereof. FIG. 7 is a perspective view illustrating a state in which the first cell sub-assembly 110M and a second cell sub-assembly 110N shown in FIG. 5 are electrically connected by means of the bus bars 132.

As illustrated in FIG. 3, the battery pack 100 according to the present embodiment generally comprises the unit cells 110, which have a cell body 110H that includes a power-generating element 111 and is formed in a flat shape, and an electrode tab 112 extends out from the cell body 110H, and which are stacked in the thickness direction (Z direction) of the cell body 110H. In addition, the battery pack 100 comprises a bus bar 132 electrically connected to the electrode tab 112 by laser welding, and a plate portion 112g that forms a stacked structure together with the electrode tab 112 along an irradiation direction (X direction) of the laser L. Each configuration of the battery pack 100 will be described below.

A plurality of the battery packs 100 are mounted in a vehicle such as an electric vehicle and used as a power source for driving a vehicle motor. The battery pack 100 is configured by electrically connecting, by means of a bus bar unit 130, a stacked body 110S formed by stacking a plurality of the unit cells 110 in a state of being pressurized by a pressurizing unit 120.

The configuration of the stacked body 110S will be described in detail.

The stacked body 110S is configured by alternately connecting in series the first cell sub-assembly 110M, which comprises three unit cells 110 electrically connected in parallel, and the second cell sub-assembly 110N, which comprises three unit cells 110 electrically connected in parallel, as illustrated in FIG. 5.

The first cell sub-assembly 110M corresponds to the three unit cells 110 positioned in the first row (lowermost row), the third row, the fifth row, and the seventh row (uppermost row) of the battery pack 100, as illustrated in FIG. 5. The second cell sub-assembly 110N corresponds to the three unit cells 110 positioned in the second row, the fourth row, and the sixth row of the battery pack 100, as illustrated in FIG. 4.

The first cell sub-assembly 110M and the second cell sub-assembly 110N are similarly configured. However, the first cell sub-assembly 110M and the second cell sub-assembly 110N are arranged such that three anode-side electrode tabs 112A and three cathode-side electrode tabs 112K are alternately positioned along the Z direction, by interchanging the tops and bottoms of the three unit cells 110, as illustrated in FIGS. 5 and 7.

In the first cell sub-assembly 110M all of the anode-side electrode tabs 112A are positioned on the right side in the drawing, and all of the cathode-side electrode tabs 112K are positioned on the left side in the drawing, as illustrated in FIGS. 5 to 7.

In the second cell sub-assembly 110N all of the anode-side electrode tabs 112A are positioned on the left side in the drawing, and all of the cathode-side electrode tabs 112K are positioned on the right side in the drawing, as illustrated in FIGS. 5 to 7. If the tops and bottoms are simply interchanged every three of the unit cells 110, the orientations of the distal end portions 112d of the electrode tabs 112 will vary vertically in the Z direction. Therefore, each of the distal end portions 112d is bent downward so that the orientations of all of the distal end portions 112d of the electrode tabs 112 of the unit cells 110 are aligned.

The unit cell 110 corresponds to a lithium ion secondary battery, for example. A plurality of the unit cells 110 are connected in series in order to satisfy the drive voltage specification of the vehicle motor. A plurality of the unit cells 110 are connected in parallel in order to ensure the battery capacity and extend the travel distance of the vehicle.

The unit cell 110 comprises the cell body 110H formed in a flat shape and the electrode tab 112 extends out from the cell body 110H, as illustrated in FIG. 3. The cell body 110H includes the power-generating element 111 that carries out charging and discharging, and a laminate film 113 for sealing the power-generating element 111.

The power-generating element 111 is charged by electric power from an outdoor charging station or the like, and supplies driving power to the vehicle motor or the like by discharging the electric power. The power-generating element 111 is formed by stacking a plurality of sets of anodes and cathodes separated by separators.

The electrode tab 112 is for exposing the power-generating element 111 to the outside, as illustrated in FIGS. 3 to 5. The electrode tab 112 is configured from the anode-side electrode tab 112A and the cathode-side electrode tab 112K. The anode-side electrode tab 112A and the cathode-side electrode tab 112K extend out from the cell body 110H toward the same direction, which intersects the thickness direction of the cell body 110H.

The proximal end side of the anode-side electrode tab 112A is joined to all of the anodes included in one power-generating element 111. The anode-side electrode tab 112A is formed in a thin plate shape, and is made of aluminum (Al) in accordance with the characteristics of the anode.

The anode-side electrode tab 112A is formed in an L shape from a proximal end portion 112c adjacent to the power-generating element 111 to a distal end portion 112d, as illustrated in FIGS. 3 and 4. The distal end portion 112d of the anode-side electrode tab 112A is bent downward in the Z direction.

The proximal end side of the cathode-side electrode tab 112K is joined to all of the cathodes included in one power-generating element 111. The cathode-side electrode tab 112K is formed in a thin plate shape, and is made of copper in accordance with the characteristics of the cathode.

The thickness of the cathode-side electrode tab 112K is less than or equal to the thickness of the anode-side electrode tab 112A. In the present embodiment the thickness of the cathode-side electrode tab 112K is half the thickness of the anode-side electrode tab 112A.

The cathode-side electrode tab 112K is formed in an L shape from a proximal end portion 112e adjacent to the power-generating element 111 to a distal end portion 112f, as illustrated in FIGS. 3 and 4. The distal end portion 112f of the cathode-side electrode tab 112K is bent downward in the Z direction, and the distal end portion 112f is folded back so as to form the plate portion 112g upward in the Z direction. That is, in the present embodiment the plate portion 112g is integrally formed with the cathode-side electrode tab 112K, and forms a stacked structure together with the cathode-side electrode tab 112K along the irradiation direction of the laser (X direction).

The plate portion 112g is formed on the side away from a cathode-side bus bar 132K, by folding the distal end portion 112f of the cathode-side electrode tab 112K back onto the side away from the cathode-side bus bar 132K, as illustrated in FIGS. 3 and 4. By folding the plate portion back onto the side away from the cathode-side bus bar 132K in this manner the current path can be shortened and the current resistance can be decreased, compared to a configuration in which the plate portion is folded back toward the side closer to the cathode-side bus bar (refer to FIG. 8).

In the present embodiment the distal end portion 112f of the cathode-side electrode tab 112K is folded back tightly so as not to form a gap. The distal end portion 112f of the cathode-side electrode tab 112K may also be folded back so as to form a gap. By forming a gap in this manner, it is possible to attenuate the output of the laser L at the gap; therefore, it is possible to more suitably prevent the laser L from penetrating the cathode-side electrode tab 112K even if the output of the laser L is increased in order to improve the welding quality.

By forming the plate portion 112g as described above it is possible to prevent the laser L from penetrating the cathode-side electrode tab 112K even if the output of the laser L is increased in order to improve the welding quality. Therefore, the cathode-side electrode tab 112K and the cathode-side bus bar 132K can be suitably laser-welded.

In addition, the following effects can be obtained when the thickness of the cathode-side electrode tab 112K is half the thickness of the anode-side electrode tab 112A, and the plate portion 112g is provided only on the cathode-side electrode tab 112K. That is, the X direction widths of the distal end portion 112f of the cathode-side electrode tab 112K including the plate portion 112g and of the distal end portion 112d of the anode-side electrode tab 112A become the same, as illustrated in FIG. 4. Therefore, since the X direction positions of the cathode-side bus bar 132K and an anode-side bus bar 132A are aligned, it is not necessary to move the focal position of the laser L in the X direction, and the electrode tab 112 and the bus bar 132 can be more easily laser-welded.

The laminate film 113 is configured in pairs, and is for sealing the power-generating element 111 from above and below along the Z direction, as illustrated in FIG. 3. In the pair of laminate films 113, the anode-side electrode tab 112A and the cathode-side electrode tab 112K extend out to the outside from gaps between portions 113a on one end along the Y direction. The laminate film 113 comprises a metal foil and a sheet having an insulating property and covering the metal foil from above and below.

The unit cells 110 are stacked as illustrated in FIGS. 3 to 5, in a state of being supported by a pair of spacers (first spacer 114 and second spacer 115), as illustrated in FIG. 6.

The pair of spacers (first spacer 114 and second spacer 115) arrange the unit cells 110 at constant intervals along the Z direction, as illustrated in FIGS. 2 and 3. The first spacer 114 supports the unit cell 110 on the side provided with the electrode tab 112. The second spacer 115 supports the unit cell 110 on the side not provided with the electrode tab 112, so as to oppose the first spacer 114 in the X direction of the unit cell 110.

The first spacer 114 is formed in an elongated plate shape having recesses and protrusions, as illustrated in FIG. 6, and is made of reinforced plastic having an insulating property. The first spacer 114 is provided so as to oppose the one end portion 113a of the pair of laminate films 113. The first spacer 114 supports the one end portion 113a of the laminate film 113 by means of a flat supporting surface 114b, as illustrated in FIGS. 3 and 6. The first spacer 114 has an abutting surface 114h on a wall surface along the Z direction adjacent to the supporting surface 114b. The abutting surface 114h positions the distal end portion 112d of the electrode tab 112 along the X direction, as illustrated in FIG. 3. The first spacer 114 has a pair of connecting pins 114c protruding upward respectively at both ends of the supporting surface 114b along the Y direction, as illustrated in FIG. 6. The pair of connecting pins 114c have a cylindrical shape, and are inserted in connecting holes 113c that open at both ends of the one end portion 113a of the laminate film 113 along the Y direction, thereby positioning the unit cell 110.

In the plurality of first spacers 114, an upper surface 114a of one first spacer 114 and a lower surface 114d of another first spacer 114 are in contact, as illustrated in FIG. 3. The plurality of first spacers 114 position each other by the fitting of a cylindrical positioning pin 114e protruding from the upper surface 114a of one first spacer 114 being into a positioning hole 114f opened on the lower surface 114d of another first spacer 114, as illustrated in FIG. 3. The first spacer 114 is provided with locating holes 114g at both ends along the Y direction, as illustrated in FIG. 6. Bolts for connecting and positioning a plurality of the battery packs 100 relative to each other along the Z direction are inserted in the locating holes 114g.

The second spacer 115 is configured by simplifying the first spacer 114, since it is not necessary for the second spacer to support the electrode tab 112. The second spacer 115 includes a supporting surface 115b for supporting the other end portion 113b of the laminate film 113, positioning pins 115e for positioning the second spacers relative to each other, connecting pins 115c for positioning the unit cell 110, and locating holes 115g into which bolts for connecting while positioning the plurality of battery packs 100 relative to each other are inserted, as illustrated in FIG. 6.

The configuration of the pressurizing unit 120 will be described in detail.

The pressurizing unit 120 includes the upper pressure plate 121 and the lower pressure plate 122, which apply pressure to the power-generating element 111 of each of the unit cells 110 of the stacked body 110S from above and below, and a pair of side plates 123 that fix the upper pressure plate 121 and the lower pressure plate 122 in a state of pressurization of the stacked body 110S.

The upper pressure plate 121, together with the lower pressure plate 122, hold and sandwich the plurality of the unit cells 110 that constitute the stacked body 110S from above and below, and pressurize the power-generating element 111 of each of the unit cells 110, as illustrated in FIGS. 1 and 2. The upper pressure plate 121 is formed in a plate shape having recesses and protrusions, and is made of a metal having sufficient rigidity. The upper pressure plate 121 is provided on a horizontal plane. The upper pressure plate 121 has a pressurizing surface 121a that pressurizes the power-generating element 111 downward, as illustrated in FIG. 2. The pressurizing surface 121a is formed flat, protruding downward from a central portion of the upper pressure plate 121. The upper pressure plate 121 has locating holes 121b into which bolts for connecting the battery packs 100 to each other are inserted. The locating holes 121b are through-holes, and open at the four corners of the upper pressure plate 121.

The lower pressure plate 122 has the same shape as the upper pressure plate 121, and is provided so that the top and bottom of the upper pressure plate 121 can be inverted, as illustrated in FIG. 2. Like the upper pressure plate 121, the lower pressure plate 122 includes a pressurizing surface 122a that pressurizes the power-generating element 111 upward, and locating holes 122b into which bolts for connecting and positioning the battery packs 100 relative to each other along the Z direction are inserted.

The pair of side plates 123 are for fixing the upper pressure plate 121 and the lower pressure plate 122 in a state of pressurization of the stacked body 110S, as illustrated in FIGS. 1 and 2. That is, the pair of side plates 123 hold the interval between the upper pressure plate 121 and the lower pressure plate 122 constant. In addition, the pair of side plates 123 cover and protect the side surfaces of the stacked unit cells 110 along the X direction. The side plate 123 is formed in a flat plate shape, and is made of metal. The pair of side plates 123 stand upright so as to face both side surfaces of the stacked unit cells 110 along the X direction. The pair of side plates 123 are welded to the upper pressure plate 121 and the lower pressure plate 122.

The configuration of the bus bar unit 130 will be described in detail.

The bus bar unit 130 includes the bus bar holder 131 that integrally holds a plurality of the bus bars 132, the bus bars 132 that electrically interconnect vertically adjacent electrode tabs 112 of the unit cells 110, the anode-side terminal 133 that causes the anode-side terminal ends of the plurality of the electrically connected unit cells 110 to face an external input/output terminal, the cathode-side terminal 134 that causes the cathode-side terminal ends of the plurality of the electrically connected unit cells 110 to oppose an external input/output terminal, and a protective cover 135 for protecting the bus bars 132, and the like.

The bus bar holder 131 is for integrally holding a plurality of the bus bars 132, as illustrated in FIGS. 2 and 5. The bus bar holder 131 integrally holds the plurality of the bus bars 132 in a matrix so as to oppose the electrode tab 112 of each of the unit cells 110 of the stacked body 110S. The bus bar holder 131 is made of resin having insulating properties, and has the form of a frame.

The bus bar holder 131 is respectively provided with a pair of columnar support portions 131a that stand upright along the Z direction, so as to be positioned on both sides of the longitudinal direction of the first spacers 114 that support the electrode tabs 112 of the unit cells 110, as illustrated in FIG. 5. The pair of columnar support portions 131a are fitted to the side surfaces of the first spacers 114. The pair of columnar support portions 131a have the form of an L when viewed along the Z direction, and have the form of a plate extending along the Z direction. The bus bar holder 131 is provided with a pair of auxiliary columnar support portions 131b at an interval, erected along the Z direction so as to be positioned in the vicinity of the center of the first spacer 114 in the longitudinal direction. The pair of auxiliary columnar support portions 131b have the form of a plate extending along the Z direction.

The bus bar holder 131 includes insulating portions 131c that respectively protrude between adjacent bus bars 132 along the Z direction, as illustrated in FIG. 5. The insulating portions 131c have the shape of a plate extending along the Y direction. Each of the insulating portions 131c is provided horizontally between the columnar support portion 131b and the auxiliary columnar support portion 131b. The insulating portion 131c prevents discharge by insulating the space between bus bars 132 that are adjacent to each other along the Z direction.

The bus bar holder 131 may be configured by joining together the columnar support portions 131a, the auxiliary columnar support portions 131b, and the insulating portions 131c, which are independently formed, or may be configured by integrally molding the columnar support portions 131a, the auxiliary columnar support portions 131b, and the insulating portions 131c.

The bus bars 132 are for electrically interconnecting the vertically adjacent electrode tabs 112 of the unit cells 110, as illustrated in FIGS. 3, 5, and 7. The bus bars 132 electrically connect the anode-side electrode tab 112A of one unit cell 110 and the cathode-side electrode tab 112K of another unit cell 110. For example, the bus bars 132 connect three vertically arranged anode-side electrode tabs 112A of the first cell sub-assembly 110M and three vertically arranged cathode-side electrode tabs 112K of the second cell sub-assembly 110N, as illustrated in FIG. 7.

That is, for example, the bus bars 132 connect the three anode-side electrode tabs 112A of the first cell sub-assembly 110M in parallel and connect the three cathode-side electrode tabs 112K of the second cell sub-assembly 110N in parallel, as illustrated in FIG. 7. Moreover, the bus bars 132 connect the three anode-side electrode tabs 112A of the first cell sub-assembly 110M and the three cathode-side electrode tabs 112K of the second cell sub-assembly 110N in series. The bus bars 132 are laser-welded to the anode-side electrode tab 112A of one unit cell 110 and the cathode-side electrode tab 112K of another unit cell 110.

The bus bar 132 is formed by joining the anode-side bus bar 132A and the cathode-side bus bar 132K, as illustrated in FIGS. 3 to 5. The anode-side bus bar 132A and the cathode-side bus bar 132K have the same shape, each having in the form of an L. The bus bar 132 is integrally formed by a joint portion 132c, which is formed by joining one bent end of the anode-side bus bar 132A, and one bent end of the cathode-side bus bar 132K, as illustrated in FIGS. 3 to 5. The anode-side bus bar 132A and the cathode-side bus bar 132K, which constitute the bus bar 132, are provided with side portions 132d that are joined to the bus bar holder 131 at both ends along the Y direction, as illustrated in FIG. 4.

The anode-side bus bar 131A is made of aluminum in the same manner as the anode-side electrode tab 112A of the unit cell 110. The cathode-side bus bar 132K is made of copper, in the same manner as the cathode-side electrode tab 112K of the unit cell 110. The anode-side bus bar 132A and the cathode-side bus bar 132K, which are made from different metals, are joined to each other by means of ultrasonic bonding, to form the joint portion 132c.

Of the bus bars 132 arranged in the form of a matrix, the bus bar 132 positioned on the upper right in the drawing in FIG. 5 corresponds to the anode-side terminal ends of 21 unit cells 110 (3 parallel 7 series), and is configured from only the anode-side bus bar 132A. This anode-side bus bar 132A is laser-welded to the anode-side electrode tabs 112A of the three uppermost unit cells 110 of the stacked unit cells 110.

Of the bus bars 132 arranged in the form of a matrix, the bus bar 132 positioned on the lower left in the drawing in FIG. 5 corresponds to the cathode-side terminal ends of 21 unit cells 110 (3 parallel 7 series), and is configured from only the cathode-side bus bar 132K.

The anode-side terminal 133 causes the anode-side terminal ends of the plurality of the electrically connected unit cells 110 to oppose an external input/output terminal, as illustrated in FIGS. 1 and 2. The anode-side terminal 133 is joined to the anode-side bus bar 132A positioned on the upper right in the drawing, from among the bus bars 132 arranged in a matrix, as illustrated in FIG. 2. The anode-side terminal 133 has the form of a plate, both ends of which are bent, and is made from a conductive metal.

The cathode-side terminal 134 causes the cathode-side terminal ends of the plurality of the electrically connected unit cells 110 to oppose an external input/output terminal, as illustrated in FIGS. 1 and 2. The cathode-side terminal 134 is joined to the cathode-side bus bar 132K positioned on the lower left in the drawing, from among the bus bars 132 arranged in a matrix, as illustrated in FIG. 2. The cathode-side terminal 134 has a form like that of the anode-side terminal 133 with the top and bottom inverted.

The protective cover 135 is for protecting the bus bars 132, and the like, as illustrated in FIGS. 1 and 2. That is, the protective cover 135 integrally covers the plurality of the bus bars 132 to thereby prevent each of the bus bars 132 from coming into contact with other members, etc., to cause electrical short-circuiting. The protective cover 135 is made from a plastic having an insulating property, where one end 135b and the other end 135c of a side surface 135a standing upright along the Z direction are bent claw-like in the X direction, as illustrated in FIG. 2.

The protective cover 135 covers each of the bus bars 132 with the side surface 135a, while sandwiching and fixing the bus bar holder 131 from above and below with the one end 135b and the other end 135c. The protective cover 135 has a first opening 135d, which is a rectangular hole and is for exposing the anode-side terminal 133 to the outside, and a second opening 135e, which is a rectangular hole and is for exposing the cathode-side terminal 134 to the outside, respectively on the side surface 135a.

Next, a method for welding the bus bars 132 to the electrode tabs 112 in the battery pack 100 according to the present embodiment will be described with reference to FIG. 4.

First, the bus bar holder 131 that integrally holds each of the bus bars 132 is joined to the side surfaces of the plurality of stacked first spacers 114 by adhesion, or the like.

At this time since the plate portion 112g is provided only on the cathode-side electrode tab 112K, the positions of the cathode-side bus bar 132K and the anode-side bus bar 132A along the X direction are aligned, as illustrated in FIG. 4.

In this state, the laser L is irradiated toward the cathode-side bus bar 132K and the anode-side bus bar 132A. At this time, because the distal end portion 112f of the cathode-side electrode tab 112K is provided with the plate portion 112g, it is possible to prevent the laser L from penetrating the cathode-side electrode tab 112K even if the output of the laser L is increased in order to improve the welding quality. Therefore, the cathode-side electrode tab 112K and the cathode-side bus bar 132K can be suitably laser-welded.

As described above, the battery pack 100 according to the present embodiment comprises the unit cells 110, which have the cell body 110H that includes the power-generating element 111 and is formed in a flat shape, and the electrode tab 112 extends out from the cell body 110H, and which are stacked in the thickness direction of the cell body 110H. In addition, the battery pack 100 comprises the bus bar 132 electrically connected to the electrode tab 112 by laser welding, and the plate portion 112g that forms a stacked structure together with the cathode-side electrode tab 112K along the irradiation direction of the laser L. By means of the battery pack 100 configured in this manner, it is possible to prevent the laser L from penetrating the cathode-side electrode tab 112K even if the output of the laser L is increased in order to improve the welding quality. Therefore, the cathode-side electrode tab 112K and the cathode-side bus bar 132K can be suitably laser-welded.

Additionally, the distal end portions 112d, 112f of the electrode tabs 112 are formed bent along the stacking direction of the unit cells 110. Moreover, the electrode tabs 112 include the anode-side electrode tab 112A, and the cathode-side electrode tab 112K that has a smaller thickness than the anode-side electrode tab 112A, and the plate portion 112g is provided only on the cathode-side electrode tab 112K. According to this configuration, compared to a configuration in which the plate portion 112g is provided only on the anode-side electrode tab 112A, it is possible to align the positions of the cathode-side bus bar 132K and the anode-side bus bar 132A along the X direction. Therefore, it is possible to more easily laser-weld the electrode tab 112 and the bus bar 132.

In addition, the plate portion 112g is integrally formed with the cathode-side electrode tab 112K by means of the distal end portion 112f of the cathode-side electrode tab 112K being folded back. Therefore, it is not necessary to prepare a separate member as the plate portion, and it is possible to form the plate portion 112g by merely folding back the distal end portion 112f of the cathode-side electrode tab 112K.

Additionally, the plate portion 112g is formed on the side away from the cathode-side bus bar 132K, by means of the distal end portion 112f of the cathode-side electrode tab 112K being folded back onto the side away from the cathode-side bus bar 132K. According to this configuration, the current path can be shortened and the current resistance can be decreased, compared to a configuration in which the distal end portion 112f of the cathode-side electrode tab 112K is folded back onto the cathode-side bus bar 132K side.

First Modified Example

Figure 8:
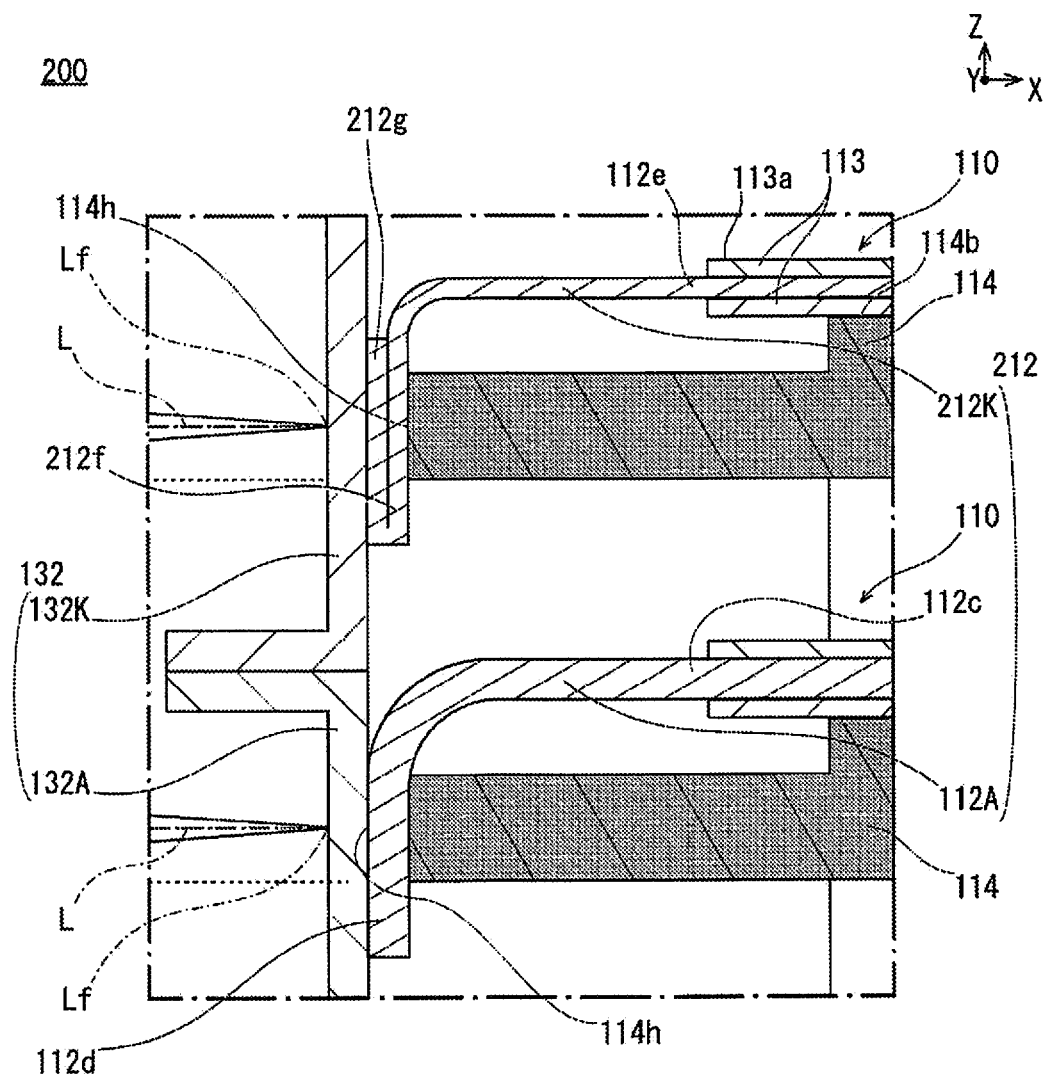
FIG. 8 is a view of a battery pack according to a first modified example, and corresponds to FIG. 4.

Next, the configuration of a battery pack 200 according to a first modified example will be described with reference to FIG. 8. FIG. 8 is a view of the battery pack 200 according to the first modified example, and corresponds to FIG. 4.

An electrode tab 212 of the battery pack 200 according to the first modified example includes the anode-side electrode tab 112A and a cathode-side electrode tab 212K, as illustrated in FIG. 8. The anode-side electrode tab 112A has the same configuration as the anode-side electrode tab 112A according to the above-described embodiment, so a description thereof will be omitted.

The cathode-side electrode tab 212K is formed in an L shape from the proximal end portion 112e adjacent to the power-generating element 111 to a distal end portion 212f, as illustrated in FIG. 8. The distal end portion 212f of the cathode-side electrode tab 212K is bent downward in the Z direction, and the distal end portion 212f is folded back so as to form a plate portion 212g upward in the Z direction.

The plate portion 212g according to the first modified example is formed adjacent to the cathode-side bus bar 132K, by folding the distal end portion 212f of the cathode-side electrode tab 212K back onto the side closer to the cathode-side bus bar 132K, as illustrated in FIG. 8.

As described above, by means of the battery pack 200 of the first modified example it is possible to prevent the laser L from penetrating the cathode-side electrode tab 212K even if the output of the laser L is increased in order to improve the welding quality. Therefore, the cathode-side electrode tab 212K and the cathode-side bus bar 132K can be suitably laser-welded.

Second Modified Example

Figure 9:
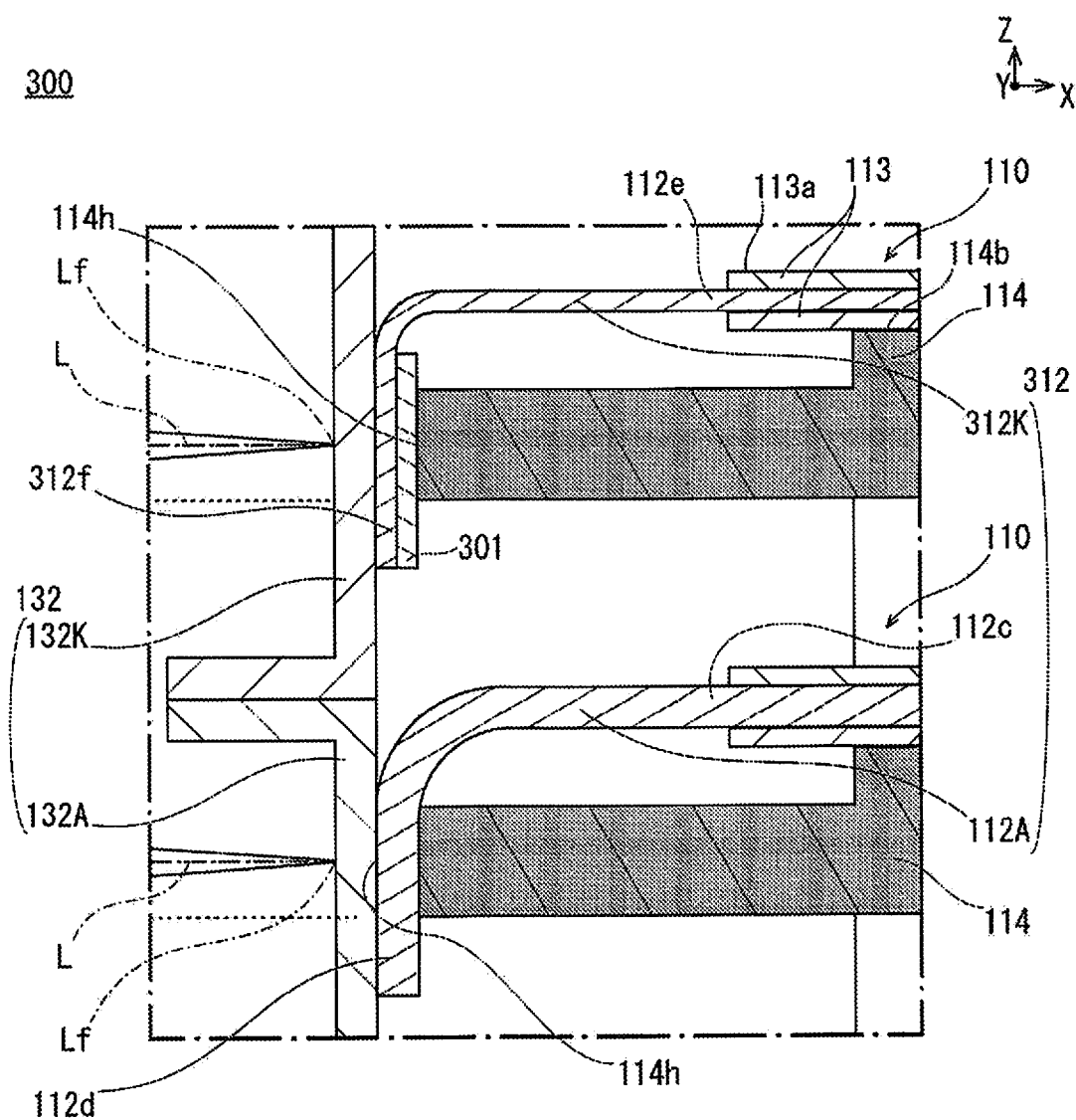
FIG. 9 is a view of a battery pack according to a second modified example, and corresponds to FIG. 4.

Next, the configuration of a battery pack 300 according to a second modified example will be described with reference to FIG. 9. FIG. 9 is a view of the battery pack 300 according to the second modified example, and corresponds to FIG. 4.

An electrode tab 312 of the battery pack 300 according to the second modified example includes the anode-side electrode tab 112A and a cathode-side electrode tab 312K, as illustrated in FIG. 9. The anode-side electrode tab 112A has the same configuration as the anode-side electrode tab 112A according to the above-described embodiment, so a description thereof will be omitted.

The cathode-side electrode tab 312K is formed in an L shape from the proximal end portion 112e adjacent to the power-generating element 111 to a distal end portion 312f, as illustrated in FIG. 9. The distal end portion 312f of the cathode-side electrode tab 312K is bent downward in the Z direction. In addition, unlike the cathode-side electrode tab 112K according to the embodiment, the cathode-side electrode tab 312K according to the second modified example is not configured such that the plate portion is formed upward in the Z direction by folding back the distal end portion 312f. Instead, in the second modified example a plate portion 301 is disposed as a separate body from the cathode-side electrode tab 312K.

The plate portion 301 is positioned on the side of the cathode-side electrode tab 312K opposite the side on which the cathode-side bus bar 132K is provided. The plate portion 301 is fixed to the cathode-side electrode tab 312K or the abutting surface 114h of the first spacer 114 in advance.

The material constituting the plate portion 301 is not particularly limited, but preferably is a metal material, from the perspective of more suitably preventing penetration by the laser L.

As described above, by means of the battery pack 300 of the second modified example it is possible to prevent the laser L from penetrating the cathode-side electrode tab 312K even if the output of the laser L is increased in order to improve the welding quality. Therefore, the cathode-side electrode tab 312K and the cathode-side bus bar 132K can be suitably laser-welded.

Third Modified Example

Figure 10:
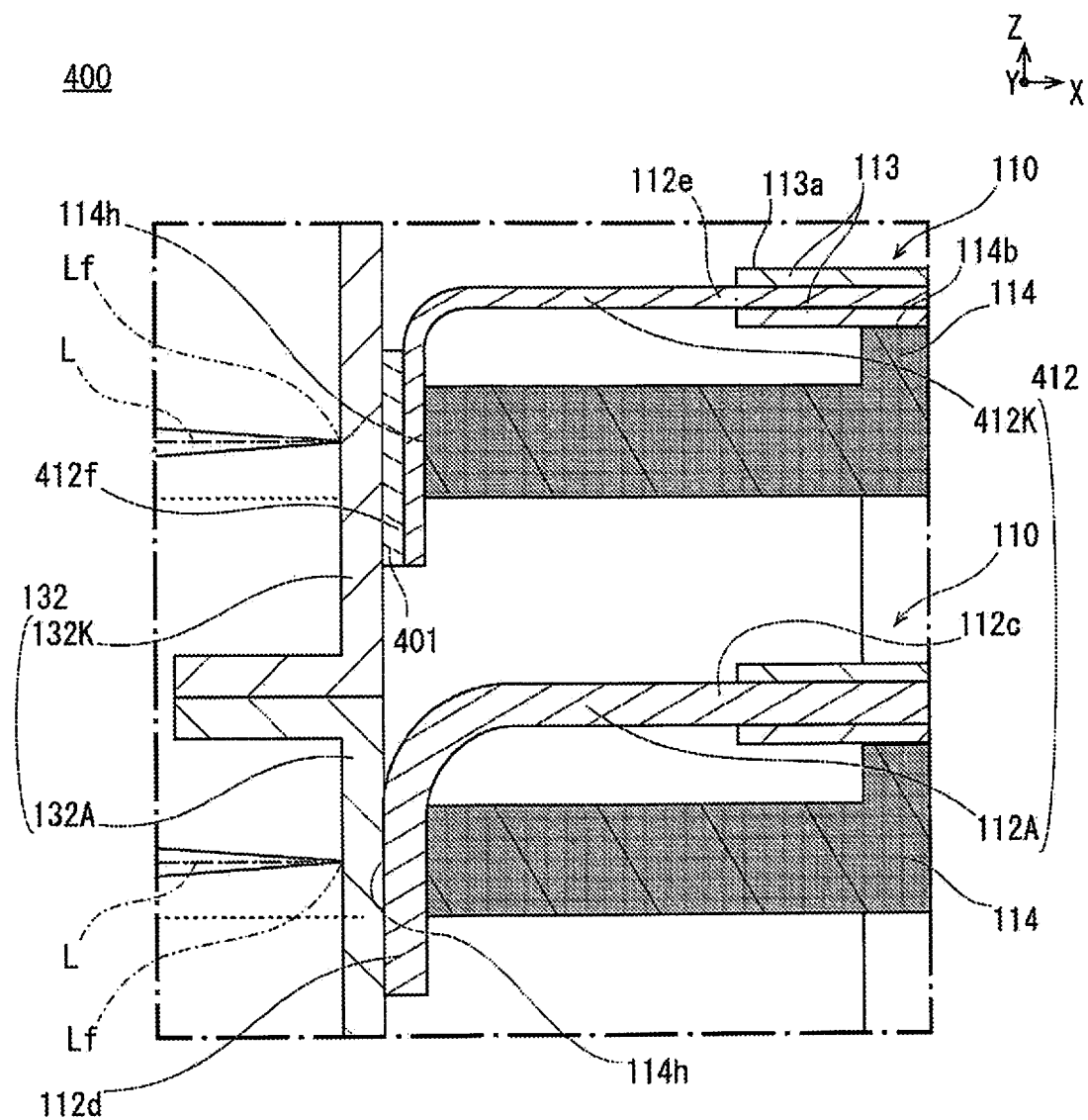
FIG. 10 is a view of a battery pack according to a third modified example, and corresponds to FIG. 4.

Next, the configuration of a battery pack 400 according to a third modified example will be described with reference to FIG. 10. FIG. 10 is a view of the battery pack 400 according to the third modified example, and corresponds to FIG. 4.

An electrode tab 412 of the battery pack 400 according to the third modified example includes the anode-side electrode tab 112A and a cathode-side electrode tab 412K, as illustrated in FIG. 10. The anode-side electrode tab 112A has the same configuration as the anode-side electrode tab 112A according to the above-described embodiment, so a description thereof will be omitted.

The cathode-side electrode tab 412K is formed in an L shape from the proximal end portion 112e adjacent to the power-generating element 111 to a distal end portion 412f, as illustrated in FIG. 10. The distal end portion 412f of the cathode-side electrode tab 412K is bent downward in the Z direction. In addition, unlike the cathode-side electrode tab 112K according to the embodiment, the cathode-side electrode tab 412K according to the third modified example is not configured such that the plate portion is formed upward in the Z direction by folding back the distal end portion 412f. Instead, in the third modified example a plate portion 401 is disposed as a separate body from the cathode-side electrode tab 412K.

The plate portion 401 is positioned between the cathode-side bus bar 132K and the cathode-side electrode tab 412K. The plate portion 401 is fixed to the cathode-side electrode tab 412K or the cathode-side bus bar 132K in advance.

The material constituting the plate portion 401 is not particularly limited as long as the material has conductivity.

As described above, by means of the battery pack 400 of the third modified example it is possible to prevent the laser L from penetrating the cathode-side electrode tab 412K even if the output of the laser L is increased in order to improve the welding quality. Therefore, the cathode-side electrode tab 412K and the cathode-side bus bar 132K can be suitably laser-welded.

In addition, various modifications to the present invention based on the configurations described in the Claims are possible, which also are in the scope of the present invention.

For example, in the above-described embodiment the distal end portions 112d, 112f of the electrode tab 112 are bent along the stacking direction of the unit cells 110, but the distal end portions may be configured so as not to be bent.

In addition, in the above-described embodiment the plate portion 112g is provided only on the cathode-side electrode tab 112K. However, the plate portion may be provided on the cathode-side electrode tab 112K and the anode-side electrode tab 112A. Alternatively, the plate portion may be provided only on the anode-side electrode tab 112A.

The invention claimed is:

1. A battery pack comprising:
a plurality of unit cells that each includes a cell body having a power-generating element and being formed in a flat shape, each of the unit cells having an electrode tab that extends out from a corresponding one of the cell bodies, and the unit cells being stacked in a thickness direction of the cell bodies;
a bus bar electrically connected to the electrode tabs by laser welding; and
a plate portion that forms a stacked structure together with the electrode tabs along an irradiation direction of the laser,
each of the electrode tabs including an anode-side electrode tab and a cathode-side electrode tab, the cathode-side electrode tabs having a different thickness than the anode-side electrode tabs, and
the plate portion being only provided on the ones of the anode-side electrode tabs and the cathode-side electrode tabs that have a smaller thickness.

2. The battery pack according to claim 1, wherein
the electrode tabs have distal end portions that extend in a stacking direction of the unit cells,
the cathode-side electrode tabs have smaller thicknesses than the anode-side electrode tabs.

3. The battery pack according to claim 1, wherein
the plate portion is integrally formed with the electrode tabs by folding back the distal end portions of the electrode tabs.

4. The battery pack according to claim 3, wherein
the plate portion is formed on a side away from the bus bar by folding the electrode tabs back onto the side away from the bus bar.

5. The battery pack according to claim 3, wherein
the plate portion is formed adjacent to the bus bar by folding the electrode tabs back onto a side closer to the bus bar.

6. The battery pack according to claim 1, wherein
the plate portion is formed as separate bodies from the electrode tabs.

7. The battery pack according to claim 6, wherein
the plate portion is positioned on a side of the electrode tabs that is opposite a side on which the bus bar is provided.

8. The battery pack according to claim 6, wherein
the plate portion is disposed between the bus bar and the electrode tabs, and is formed of a conductive member.

* * * * *